(12) United States Patent
Ketterer et al.

(10) Patent No.: US 7,003,943 B2
(45) Date of Patent: Feb. 28, 2006

(54) METHOD AND DEVICE FOR LAMBDA CONTROL AND FOR CATALYTIC CONVERTER DIAGNOSIS IN AN INTERNAL COMBUSTION ENGINE

(75) Inventors: Alexander Ketterer, Regensburg (DE); Hong Zhang, Tegernheim (DE)

(73) Assignee: Siemens Aktiengellschaft, Munich (DE)

( * ) Notice: Subject to any disclaimer, the term of this patent is extended or adjusted under 35 U.S.C. 154(b) by 66 days.

(21) Appl. No.: 10/837,741

(22) Filed: May 4, 2004

(65) Prior Publication Data
US 2004/0250533 A1 Dec. 16, 2004

(51) Int. Cl.
*F01N 3/00* (2006.01)

(52) U.S. Cl. .................... 60/277; 60/274; 60/276; 60/285

(58) Field of Classification Search .......... 60/274, 60/276, 277, 285, 284, 297
See application file for complete search history.

(56) References Cited

U.S. PATENT DOCUMENTS

| | | | | |
|---|---|---|---|---|
| 6,167,695 B1 * | 1/2001 | Itou et al. | ...... | 60/274 |
| 6,309,536 B1 * | 10/2001 | Inagaki et al. | ...... | 205/781 |
| 6,481,199 B1 * | 11/2002 | Bidner et al. | ...... | 60/274 |
| 6,490,856 B1 * | 12/2002 | Bidner et al. | ...... | 60/274 |
| 6,499,291 B1 * | 12/2002 | Lang et al. | ...... | 60/277 |

FOREIGN PATENT DOCUMENTS

| | | |
|---|---|---|
| DE | 19606652 A1 | 8/1997 |
| DE | 198 52 244 C1 | 12/1999 |
| DE | 19620417 C2 | 2/2001 |
| DE | 198 44 994 C2 | 1/2002 |

OTHER PUBLICATIONS

R. Basshuysen et al., ATZ/MTZ Fachbuch, Handbuch Verbrennungsmotor, 2 verbesserte Auflage, Jun. 2002.

* cited by examiner

*Primary Examiner*—Binh Q. Tran
(74) *Attorney, Agent, or Firm*—Morrison & Foerster LLP

(57) ABSTRACT

In the present invention lambda control is carried out by using a $NO_x$ sensor which is arranged in the catalytic converter or downstream of this. At the same time on the basis of the measured $NO_x$ values the operating status is adjusted and the oxygen storage capacity of the catalytic converter is determined for diagnostic purposes.

10 Claims, 1 Drawing Sheet

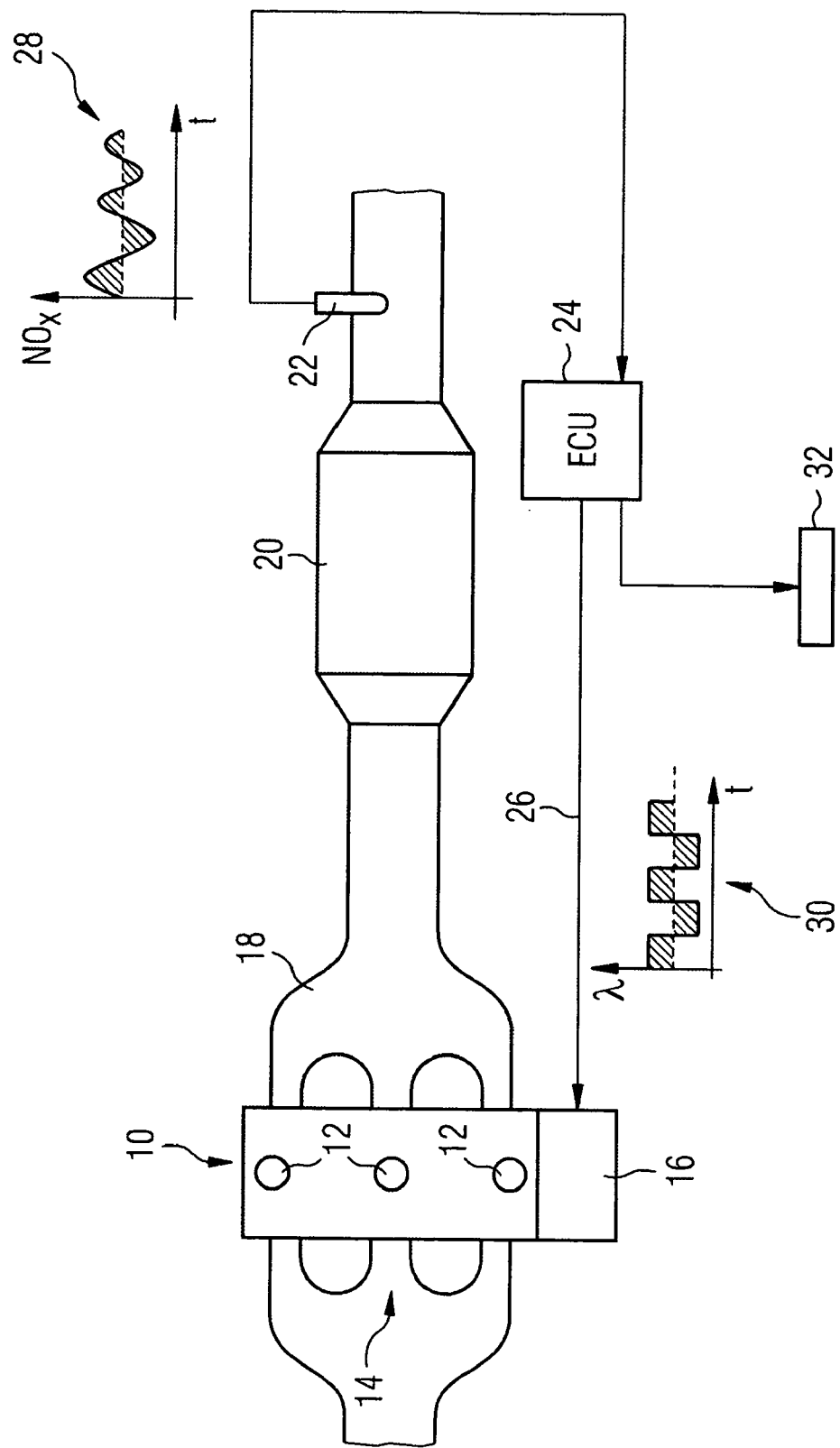

METHOD AND DEVICE FOR LAMBDA CONTROL AND FOR CATALYTIC CONVERTER DIAGNOSIS IN AN INTERNAL COMBUSTION ENGINE

CLAIM FOR PRIORITY

This application claims priority to German Application No. 103 199 83.7 filed May 5, 2003, which is incorporated herein, in its entirety, by reference.

TECHNICAL FIELD OF THE INVENTION

The invention relates to a method and device for lambda control and for catalytic converter diagnosis in an internal combustion engine.

BACKGROUND OF THE INVENTION

In gasoline engines, catalytic after-treatment of exhaust gases by means of a controlled three-way catalytic converter has become the established method for complying with the legal requirements on emission limitation. The complete combustion of fuel is found to require approximately 14.7 kg of air per kg of fuel. For the purpose of characterising the composition of the mixture, the air ratio $\lambda$ is defined as the ratio of the quantity of air supplied for combustion of a unit quantity of the supplied fuel to the minimum quantity of air required for complete combustion.

The air-fuel mixture is controlled by means of a lambda probe, enabling a conclusion to be drawn about the lambda value of the exhaust gases. In the case of zirconium dioxide probes a step characteristic for lambda=1 occurs. Each time the mixture changes from rich to lean or from lean to rich a voltage jump occurs. The combined effects of ageing and environmental influences (contamination) on the catalytic converter give rise to defects which displace the voltage jump. For this reason a controller with a two-point reference probe is used downstream of the catalytic converter, such that the probe downstream of the catalytic converter changes the controlled shift between rich and lean by means of a slow compensation loop.

In addition to the two-point controller described previously, a controller is also known which uses probes described as broadband.

These deliver an unequivocal signal in a wide lambda range $0.7<\lambda<4$ which increases in linear fashion. Such a steady probe enables a greater dynamic response from the controller.

$NO_x$ sensors are also known, and enable the direct measurement of the nitric oxide concentration in the exhaust gas from gasoline and diesel engines. In low-emission designs such as SULEV II, $NO_x$ sensors in prior art are used for the optimum control and diagnosis of catalytic converters with the aid of the engine controller, and for compliance with OBD requirements when testing a three-way catalytic converter. For example in the manual "Verbrennungsmotor" ("Internal combustion engine"), second edition, Viehweg, page 590, an operating principle for a $NO_x$ sensor is described. This design of $NO_x$ sensor provides for two chambers, by which in a first chamber the oxygen contained in the exhaust gas is reduced (lean exhaust gas) or increased (rich exhaust gas) by creating a pump current at constant partial pressure. The necessary current is here proportional to the reciprocal of the air-to-force ratio. In the second chamber, $NO_x$ reduction takes place at the test electrode. The current necessary for keeping the surroundings of the electrode clear of oxygen is here proportional to the nitric oxide concentration and usually forms the measurement signal.

SUMMARY OF THE INVENTION

The invention provides a method and a device for lambda control in an internal combustion engine enabling lambda control and diagnosis of the state of the catalytic converter to be carried out by simple means with reliable and long-term accuracy.

In one embodiment of the invention, there is a method in which a $NO_x$ sensor is arranged after a partial volume of the catalytic converter or downstream of the catalytic converter. The $NO_x$ sensor is then downstream of the catalytic converter intake, so that the exhaust gases measured by the $NO_x$ sensor will have flowed through at least a part of the catalytic converter. The $NO_x$ sensor provides an engine controller with signals including a value for the $O_2$ concentration and a value for the $NO_x$ concentration in the exhaust gas. The engine controller specifies for a fuel injector a forced excitation which has an average lambda value and a mixture varying between rich and lean. The engine controller uses the signal for the $O_2$ concentration to define the average value for the air-fuel mixture and uses the value for the $NO_x$ concentration to diagnose the status of the catalytic converter. In the method to which the invention relates the $NO_x$ sensor is used for lambda control. The disadvantages of a two-point controller which has no reference probe are avoided by using the measured $NO_x$ concentration to adapt the loading on the catalytic converter to its ageing status with the aid of the forced excitation. In the method to which the invention relates the known two lambda probes are replaced by a $NO_x$ sensor located after the catalytic converter or after a partial volume of the catalytic converter. Due to its physical design the $NO_x$ sensor delivers a signal to measure the $NO_x$ in the exhaust gas and a signal which is proportional to the residual oxygen content of the exhaust gas and permits the stoichiometric composition of the mixture to be decided with great accuracy. The mixture adjustment is operated as a reference adjustment by means of the $O_2$ signal superimposed by a pre-controlled forced excitation. Catalytic converter diagnosis takes place at the same time.

In a further preferred embodiment of the method to which the invention relates, the engine controller corrects the fuel injection in accordance with the measured values. In a similar way to the two-point controller with reference probe downstream of the catalytic converter, the effects of aging, environmental influence and the like on the catalytic converter and/or sensor can be corrected by a "slower" compensation loop with the aid of the stabilised mixture after the catalyser volume.

The engine controller defines the frequency and/or amplitude of the forced excitation as appropriate to the status of the catalytic converter. For instance, if the engine controller detects that the $NO_x$ concentration is oscillating, especially if this matches the frequency of the forced excitation, the engine controller recognises this and reduces the amplitude and/or frequency of the forced excitation.

In a preferred embodiment of the method to which the invention relates, the engine controller accumulates the deviation of the measurement signals from an average $NO_x$ concentration. For this purpose, the amount of the deviation is integrated over a time period. The accumulated value is compared with the value accumulated over time of the deviation of the lambda values from the forced excitation. For comparison the engine controller converts the $NO_x$ concentration into an $O_2$ concentration or vice versa. Preferably the oxygen storage capacity (OSC) for the catalytic converter is determined from this comparison.

The method to which the invention relates therefore provides diagnosis of the catalytic converter whilst simultaneously determining the OSC status of the catalytic converter and measuring the $NO_x$ content of the exhaust gas. This makes it possible to determine catalytic converter efficiency with accuracy whilst improving compliance with future legal requirements for catalytic converter diagnostics.

Preferably, when the internal combustion engine is in a cold start phase the engine controller controls engine warm-up on the basis of the measured $NO_x$ concentration. Likewise, in the cold start phase the engine controller can control catalytic converter warm-up on the basis of the $NO_x$ concentration. This makes it possible to ensure effective monitoring of the cold-start strategies, as they are known, and to create the preconditions for measures providing a lean warm-up of the catalytic converter after starting.

In another embodiment of the invention, there is an internal combustion engine with one or more cylinders with an exhaust gas system fitted with a catalytic converter. In addition, the device includes: a $NO_x$ sensor arranged after a partial volume of the catalytic converter or downstream of this converter and is connected by an electrical conductor to an engine controller which reads and processes measured values for $O_2$ concentration and $NO_x$ concentration in the exhaust gas. The engine controller is connected by an electrical conductor to a fuel injection device which supplies the one cylinder or more with a mixture varying between rich and lean by an average lambda value. The engine controller has a first module for calculating the average value for the air-fuel mixture and a second module for diagnosing the catalytic converter on the basis of the measured $NO_x$ values. In contrast to known lambda control devices, the device to which the invention relates does not have two $O_2$ sensors, but economises on the use of one of the sensors by using only a single sensor, resulting in a significant cost reduction.

In another preferred embodiment, the engine controller has a third module for determining the frequency and/or amplitude of the forced excitation in accordance with the measured $NO_x$ values.

The method to which the invention relates and the device can be used both in an internal combustion engine with direct fuel injection and in an internal combustion engine with intake-manifold fuel injection.

BRIEF DESCRIPTION OF THE DRAWINGS

The invention is explained in the exemplary embodiment which follows.

FIG. 1 shows a diagram of the lambda control for an internal combustion engine with a three-way catalytic converter.

DETAILED DESCRIPTION OF THE INVENTION

FIG. 1 shows an internal combustion engine 10, and identifies three of the engine's cylinders 12. Fresh air is fed to the cylinders through an intake system 14. An internal exhaust gas recirculation (not shown) feeds a mixture of fresh air and exhaust gas to the cylinders. Indicated in the form of a diagram, a fuel injection device 16 injects an adequate quantity of fuel at specified moments. The exhaust gas system 18 feeds the exhaust gases to a three-way catalytic converter 20. The three-way catalytic converter is able to remove carbon monoxide (CO), nitric oxide ($NO_x$) and hydrocarbon (HC) in adequate amounts if the composition of the mixture is within a range known as the catalyser window.

Downstream of the catalytic converter is a $NO_x$ sensor 22 which delivers an unequivocal, linear signal for determining $NO_x$ concentration and shows a step characteristic for $\lambda=1$ with the aid of a second signal. The measured values are forwarded to an engine controller (ECU) 24, where they are evaluated. The evaluation generates control signals 26 for the fuel injection device 16 and diagnostic signals for determining the status of the catalytic converter 20.

To determine the oxygen storage capacity (OSC) of the catalytic converter the engine controller compares the deviation, accumulated over time, of the $NO_x$ signals from an average $NO_x$ value.

The accumulated values (broken lines in diagram 28) are compared with the accumulated lambda values. The comparison of these values enables the engine controller to determine the quantity of oxygen stored in the catalytic converter 20. Characterised by the oxygen storage capacity, the amplitude and frequency of the oscillations in the $NO_x$ signals are processed by the engine controller 24 and forwarded to a diagnostic device 32 as a diagnostic signal.

The improvement in diagnostic accuracy by determining the $NO_x$ conversion capability of the catalytic converter in combination with the OSC status serves to fulfil the latest legal requirements, especially in the USA. The monitoring of cold-start strategies by measuring the $NO_x$ emission in the cold-start phase of the internal combustion engine, and thus the ability to evaluate and control measures providing the catalytic converter with a lean warm-up after starting, constitute a further advantage of the invention. There is also the option to ensure that the measures providing a lean warm-up for the catalytic converter are adapted to the ageing of the catalyser and the tolerance of the system. This makes it possible to improve lifelong emission performance. By making additional use of forced excitation the dynamic demands on the mixture controller are slight. Whether the installation site is after or in the catalytic converter is therefore mainly variable and can be determined by the optimum volume of catalytic converter needing to be diagnosed. By making additional use of forced excitation the frequency and amplitude of a diagnostic cycle in the catalytic converter can be regulated so that optimum conditions are reached without interrupting the mixture controller (closed-loop diagnostics). Diagnosis of the catalytic converter can then be carried out on a neutral basis with regards to emissions. $NO_x$ measurement can also be carried out under transient engine operating conditions, which means that the frequency of diagnosis under actual conditions of use can be increased.

What is claimed is:

1. A method for controlling lambda in an internal combustion engine with a catalytic converter fitted in an exhaust gas system, comprising:
    measuring, using a $NO_x$ sensor installed after a partial volume of the catalytic converter or downstream of the catalytic converter, a value for an $O_2$ concentration and a value for the $NO_x$ concentration in exhaust gas;
    feeding the measured values to an engine controller, where the engine controller specifies for a fuel injector a forced excitation with a mixture that varies between rich and lean by an average lambda value;
    calculating the average value for the air-fuel mixture using the measured value for $O_2$ concentration; and diagnosing a status of the catalytic converter using the measured value for $NO_x$ concentration.

2. The method according to claim 1, wherein the engine controller corrects the average value for the fuel injection with aid of the $NO_x$ sensor.

3. The method according to claim 1, wherein the engine controller determines the frequency and/or amplitude of forced excitation in accordance with the status of the catalytic converter.

4. The method according to claim 3, wherein if there is an oscillation in the measured signals for $NO_x$ concentration, the amplitude and/or frequency of the forced excitation is reduced in accordance with the status of the catalytic converter.

5. The method according to claim 1, wherein
the engine controller accumulates a deviation of the measured signals from an average $NO_x$ concentration and compares the accumulated value with the deviations of the lambda values of the forced excitation accumulated over time,
the $NO_x$ concentration is converted into an $O_2$ concentration or the $O_2$ concentration is converted into the $NO_x$ concentration.

6. The method according to claim 5, wherein an oxygen storage capacity for the catalytic converter is determined from the comparison.

7. The method according to claim 1, wherein in a cold-start phase of the internal combustion engine, the engine controller controls the engine warm-up based on the measured $NO_x$ concentration.

8. The method according to claim 1, wherein in a cold-start phase of the internal combustion engine, the engine controller controls the catalytic converter warm-up based on the measured $NO_x$ concentration.

9. A device for lambda control in an internal combustion engine with one or more cylinders and a catalytic converter fitted in an exhaust gas system, comprising:
- a $NO_x$ sensor is arranged after a partial volume of the catalytic converter or downstream of the converter and is connected by an electrical conductor to an engine controller which reads measured values for $O_2$ concentration and $NO_x$ concentration in the exhaust gas,
- the engine controller is connected by an electrical conductor to a fuel injection device which injects into the one or more cylinders a mixture varying between rich and lean by an average lambda value, and
- the engine controller has a first module for calculating an average value for the air-fuel mixture and a second module for diagnosing the catalytic converter based on the measured $NO_x$ concentration.

10. The device according to claim 9, wherein the engine controller has a third module for calculating the amplitude and/or frequency of the forced excitation.

* * * * *